United States Patent
Ishiyama

(10) Patent No.: US 9,720,305 B2
(45) Date of Patent: Aug. 1, 2017

(54) IMAGING AID, IMAGING DEVICE, AND IMAGING METHOD

(71) Applicant: NEC Corporation, Minato-ku, Tokyo (JP)

(72) Inventor: Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 10 days.

(21) Appl. No.: 14/418,157

(22) PCT Filed: Aug. 2, 2013

(86) PCT No.: PCT/JP2013/070987
§ 371 (c)(1),
(2) Date: Jan. 29, 2015

(87) PCT Pub. No.: WO2014/021449
PCT Pub. Date: Feb. 6, 2014

(65) Prior Publication Data
US 2015/0192838 A1    Jul. 9, 2015

(30) Foreign Application Priority Data

Aug. 3, 2012  (JP) ................................ 2012-172701

(51) Int. Cl.
*G06K 9/74* (2006.01)
*G03B 15/06* (2006.01)
(Continued)

(52) U.S. Cl.
CPC ......... *G03B 15/06* (2013.01); *G02B 13/0015* (2013.01); *G03B 15/02* (2013.01);
(Continued)

(58) Field of Classification Search
CPC . G01N 2035/00237; G01N 2035/0449; G01N 21/07; G01N 33/02; G01N 35/00029; G02B 13/0015; G02B 1/111; G02B 2027/0141; G02B 2027/0156; G02B 2027/0178; G02B 27/0172; G02B 27/0176; G02B 6/0021
See application file for complete search history.

(56) References Cited

U.S. PATENT DOCUMENTS

2003/0082505 A1    5/2003  Frohlich et al.

FOREIGN PATENT DOCUMENTS

| DE | 102009009599 A1 | 8/2010 |
| DE | 102010007421 B3 | 7/2011 |

(Continued)

OTHER PUBLICATIONS

Extended European Search Report for EP Application No. EP13825572.4 dated on Feb. 5, 2016.
(Continued)

*Primary Examiner* — Michael P Stafira

(57) ABSTRACT

The present invention is an imaging aid aiding imaging of a predetermined region of a surface of an object having minute concave and convex portions and being subject to intense specular reflection, including: a light source unit that irradiates light; and a cover lid to cover a predetermined region of a surface of the object, where a part of a surface of the cover lid corresponding to a predetermined angular range from a normal line direction directly opposing the predetermined region is a black surface, and another surface of the cover lid corresponding to another angular range is made of a light-source surface diffusing and emitting light irradiated from the light source unit.

7 Claims, 11 Drawing Sheets

(51) Int. Cl.
    *G03B 15/02*     (2006.01)
    *G03B 17/56*     (2006.01)
    *G02B 13/00*     (2006.01)
    *G03B 15/05*     (2006.01)
    *H04N 5/225*     (2006.01)

(52) U.S. Cl.
    CPC ........... *G03B 15/05* (2013.01); *G03B 17/565* (2013.01); *H04N 5/2254* (2013.01)

(56) References Cited

FOREIGN PATENT DOCUMENTS

| | | |
|---|---|---|
| JP | H11-223851 A | 8/1999 |
| JP | 2004-246098 A | 9/2004 |
| JP | 2005-181598 A | 7/2005 |
| JP | 2005-234422 A | 9/2005 |
| JP | 2006-49990 A | 2/2006 |
| JP | 2008-027336 A | 2/2008 |
| JP | 2008-102103 A | 5/2008 |
| JP | 2009-284455 A | 12/2009 |
| JP | 2013-201635 A | 10/2013 |

OTHER PUBLICATIONS

International Search Report for PCT Application No. PCT/JP2013/070987, mailed on Oct 15, 2013.
Japanese Office Action for JP Application No. 2014-528237 mailed on Nov. 15, 2016 with English Translation.
Japanese Office Action for JP Application No. 2014-528237 mailed on Feb. 28, 2017 with English Translation.

Fig.2
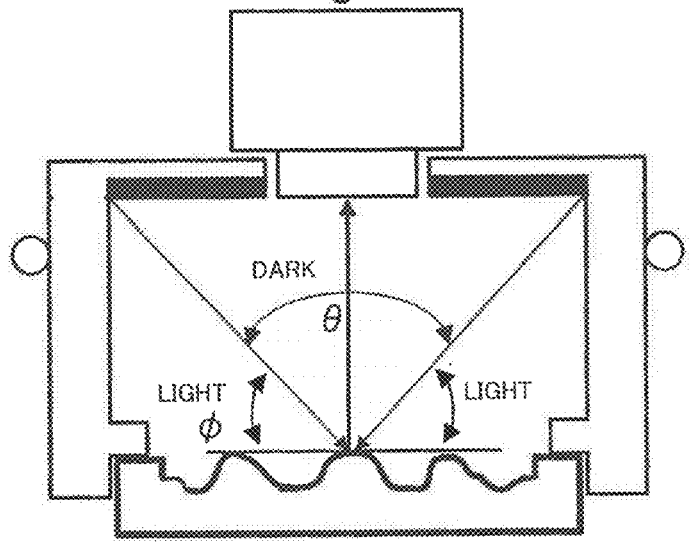
AS θ GETS LARGER, THE BLACK SURFACE REGION ALSO GETS LARGE, AND THE PORTION OF THE PEARSKIN SURFACE TO BE IMAGED BLACK GETS LARGE.
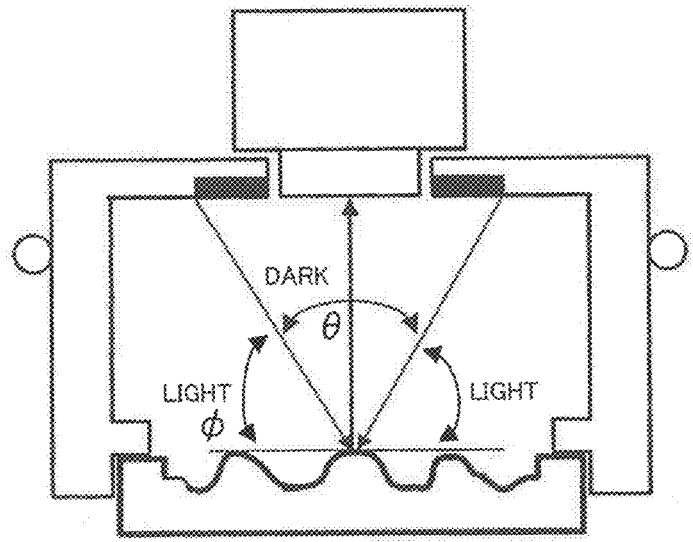
AS θ GETS SMALLER, THE BLACK SURFACE REGION ALSO GETS SMALL, AND THE PORTION OF THE PEARSKIN SURFACE TO BE IMAGED BLACK GETS SMALL.

IMAGING AID, IMAGING DEVICE, AND IMAGING METHOD

This application is a National Stage Entry of PCT/JP2013/070987 filed on Aug. 2, 2013, which claims priority from Japanese Patent Application 2012-172701 filed on Aug. 3, 2012, the contents of all of which are incorporated herein by reference, in their entirety.

TECHNICAL FIELD

The present invention relates to an imaging aid, an imaging device, and an imaging method for imaging an object having concave or convex surfaces subject to intense specular reflection.

BACKGROUND ART

A system of imaging concave and convex portions on a surface of an object, for using the obtained images for inspection, authentication, or the like has been formulated.

For example, Patent Literature 1 describes a light irradiating device including a light diffuser having substantially a plate form or a dorm form provided to be adjacent to and cover the inspection region imaged by the inspection camera, a plurality of light irradiators provided outside the light diffuser to be apart from one another, and transmitting light through the light diffuser to irradiate the inspection region with the light, and a cylindrical member elongating in the direction of the camera from around the hole for imaging and observation provided for the light diffuser, which is configured so that the camera can image the inspection region through the cylindrical member and the hole for observation and so that light from the light irradiator does not directly enter the opening of the cylindrical member at the side of the camera.

On the other hand, attempts to use individual difference in minute convex and concave portions of an object for authentication and verification have started.

CITATION LIST

Patent Literature

Patent Literature 1: Japanese Patent Application Publication No. 2008-102103

SUMMARY OF INVENTION

Technical Problem

However, when using such individual difference in minute convex and concave portions of an object for authentication and verification, so as to obtain a stable verification result, it is required to obtain a captured image from which the same feature point can be extracted at the time of registration and at the time of verification respectively. For this purpose, the captured image should have clear contrast in minute concave and convex portions of the surface of an object.

However, although directed to an imaging aid for imaging the concave and convex portions of an object, the technology of Patent Literature 1 aims at resolving luminance shortage or luminance irregularity. Therefore, the technology of Patent Literature 1 emits light from all directions and all the light-irradiation cubic angles, and therefore cannot clearly image shading difference of minute concave and convex portions of an object.

The present invention has been conceived of in view of the above-described problem, and aims at providing an imaging guide, an imaging device, and an imaging method able to emphasize contrast of concave and convex portions on a surface of an object, e.g., a pearskin pattern provided on an article, as well as enabling to obtain a captured image from which a stable feature point can be extracted and not susceptible to minute difference in position or orientation of an object which cannot be avoided at the time of imaging.

Solution to Problem

The present invention is an imaging aid aiding imaging of a predetermined region of a surface of an object having minute concave and convex portions and being subject to intense specular reflection, including: a light source unit that irradiates light; and a cover lid having a shape to cover a predetermined region of a surface of the object, where a part of a surface of the cover lid corresponding to a predetermined angular range from a normal line direction directly opposing the predetermined region is a black surface, and another surface of the cover lid corresponding to another angular range is made of a light-source surface diffusing and emitting light irradiated from the light source unit.

The present invention is an imaging device imaging a pearskin surface having a pearskin pattern provided on an object, including: a light source unit that irradiates light; a camera; and a cover lid that has a shape to cover a predetermined region of the pearskin surface, where a part of the pearskin surface corresponding to a predetermined angular range from a normal line direction of the predetermined region of the pearskin surface is a black surface, another surface corresponding to another angular range is made of a surface diffusing light irradiated from the light source unit, and an imaging hole to mount the camera is provided on a center of the black surface.

The present invention is an imaging method for aiding imaging of a predetermined region of a surface of an object having minute concave and convex portions and being subject to intense specular reflection, where a cover lid has a shape to cover a predetermined region of a surface of the object, a part of a surface of the cover lid corresponding to a predetermined angular range from a normal line direction directly opposing the predetermined region is a black surface, and another surface of the cover lid corresponding to another angular range is made of a light-source surface diffusing and emitting light irradiated from the light source unit.

Advantageous Effects of Invention

The present invention can capture an image on which contrast of concave and convex portions of a surface of an object, e.g., pearskin pattern provided on a surface of an object, is emphasized.

BRIEF DESCRIPTION OF DRAWINGS

FIG. 2 is a diagram explaining a black surface region of a covering lid.

DESCRIPTION OF EMBODIMENTS

The present invention relates to an imaging aid and an imaging device imaging concave and convex portions of a surface of an object, e.g., a pearskin pattern provided on a surface of an object. Exemplary embodiments of the present invention are detailed as follows.

Figure 1:
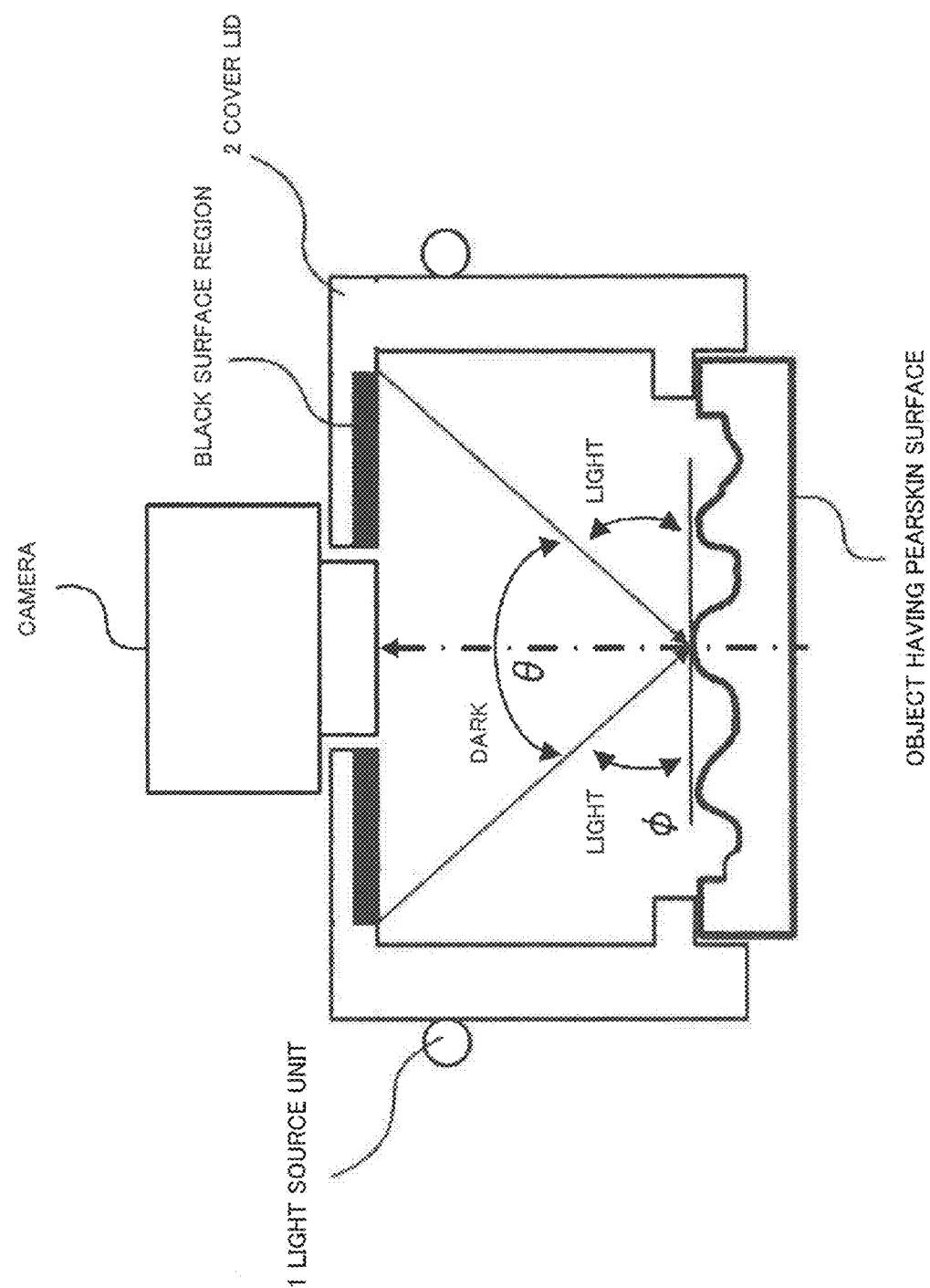
FIG. 1 is a diagram explaining an overview of the present invention.

The overview of the present invention is described with reference to FIG. 1. An imaging aid according to an exemplary embodiment of the present invention is an imaging aid aiding imaging of a predetermined region of a surface having minute concave and convex portions and being subject to intense specular reflection (e.g., a pearskin surface having a pearskin pattern), of an object, and includes a light source unit 1 irradiating light, and a cover lid 2 having a shape to cover a predetermined region of a surface of an object, a part of a surface of the cover lid 2 corresponding to a predetermined angular range from the normal line direction directly opposing the predetermined region being black and absorbing light, and another surface of the cover lid 2 corresponding to another angular range is formed by a light-source surface diffusing and emitting light irradiated from the light source unit 1.

For example, the cover lid 2 is formed to be parallel to the pearskin surface, is provided with an imaging hole through which image capturing is performed from the normal line direction of the pearskin surface, and includes an upper portion having a region opposing the pear surface being black, and a side portion formed to be vertical to the upper surface and made of a material diffusing light of the light source unit 1.

The black surface region of the cover lid 2 is determined by the angular range of a dark region θ and the angular range of a light region φ with respect to the normal line of a surface in a verification region of the pearskin surface of an object (e.g., top surface of the convex portion at the center of the verification region). In this way, the distribution of the black surface and the diffusing surface is determined solely by the angular range with respect to the normal line direction of the pearskin surface, and its form and angle of the surface is arbitrary. In other words, although the diffusing material's surface is explained to be vertical to the black surface in paragraph 0015, this is one example, and its form and arrangement angle are arbitrary. The black surface may not also be plane, and may have an arbitrary form as long as it covers all the range of the angle θ from the normal line direction of the pearskin surface.

Since the black surface region of the cover lid 2 does not reflect the illumination light from the light source unit 1, the top portion of the convex portion of the pearskin surface directly opposing the camera mounted to the imaging hole of the upper surface is imaged to be black. As shown in FIG. 2, there is a relation between the size of the black surface region of the cover lid 2 and the angular range θ of the dark region, such as the larger the angular range θ of the black dark region, the larger gets the black surface region of the cover lid 2, and as the smaller the angular range θ of the dark region, the smaller gets the black surface region of the cover lid 2. As the larger the black surface region of the cover lid 2, the portion of the pearskin surface imaged to be black gets larger, and as the smaller the black surface region, the portion of the pearskin surface imaged to be black gets smaller. In the present invention, the angular ranges θ and φ are adjusted so that the number of black pixels in the verification region in the captured image of the pearskin surface or the degree of separation of the brightness value of the pixels in the verification region is a predetermined value (e.g., 25%). Specifically, the size of the black surface region of the cover lid 2 may be changed, or the height of the side surface of the cover lid 2 may be changed. Various methods can be used to achieve this result. In one example, a screw mechanism for moving up and down the black surface region is included, and the height of the side surface of the cover lid 2 can be adjusted by rotating the screw mechanism. This is just one example, and other methods can also be used.

Since the actual sizes of the pearskin surface's concave and convex portions vary depending on the parameters used at the time of processing the authentication target, the angular ranges θ, φ are adjusted to obtain a black surface region of an adequate size, thereby optimizing the brightness distribution of the image to be captured. Note that a brightness value which yields the maximum first derivation of the brightness change histogram is used for the threshold value for binarization.

Accordingly, the top portion of the convex portion of the pearskin surface having the normal line in the direction directly opposing the camera will be imaged to be black, and the concave portion of the pearskin surface not directly opposing will be imaged to be white as a result of reflection of light from various directions. As a result, dark and light contrast in the concave and convex portions in the obtained image is emphasized, and it becomes easy to stably extract the top portion as the feature point from the image.

Figure 3:
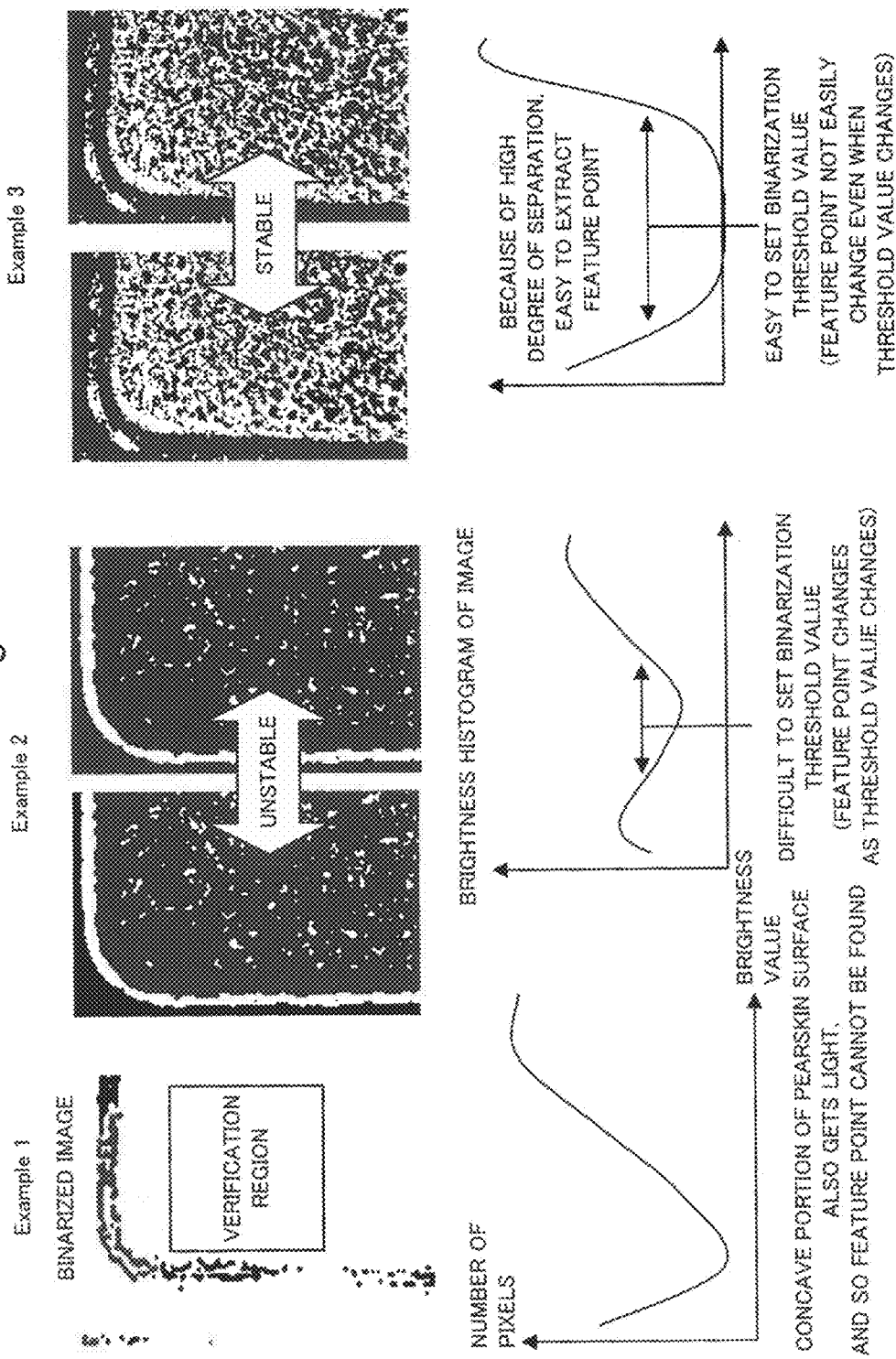
FIG. 3 is a diagram explaining an image obtained by imaging a pearskin surface using the present invention and an image obtained by imaging without using the present invention.

FIG. 3 shows an example of binarized image of the pearskin surface imaged by using the invention of the present application and binarized image of the pearskin surface imaged not using the invention of the present application. In Example 1 imaged not using the present invention, the concave portion of the verification region is also imaged to be white, and the feature point cannot be found therein. In another example (Example 2) imaged not using the present invention, it is difficult to set the threshold value used in binarizing the captured image, and the feature point changes by change in threshold value. As opposed to them, Example 3 obtained by imaging the pearskin surface using the present invention has a high degree of separation between the concave portion and the convex portion of the obtained image. Therefore, the feature point of the binarized image is stable and not vulnerable to even a small change in threshold value of binarization. In addition, even when the object is not firmly fixed when imaging the object and the orientation of the pearskin surface is minutely changed, if the angle is sufficiently smaller than θ, the top portion can still be always clearly extracted as the dark region, which means that the feature point can be stably extracted.

First Exemplary Embodiment

Figure 4:
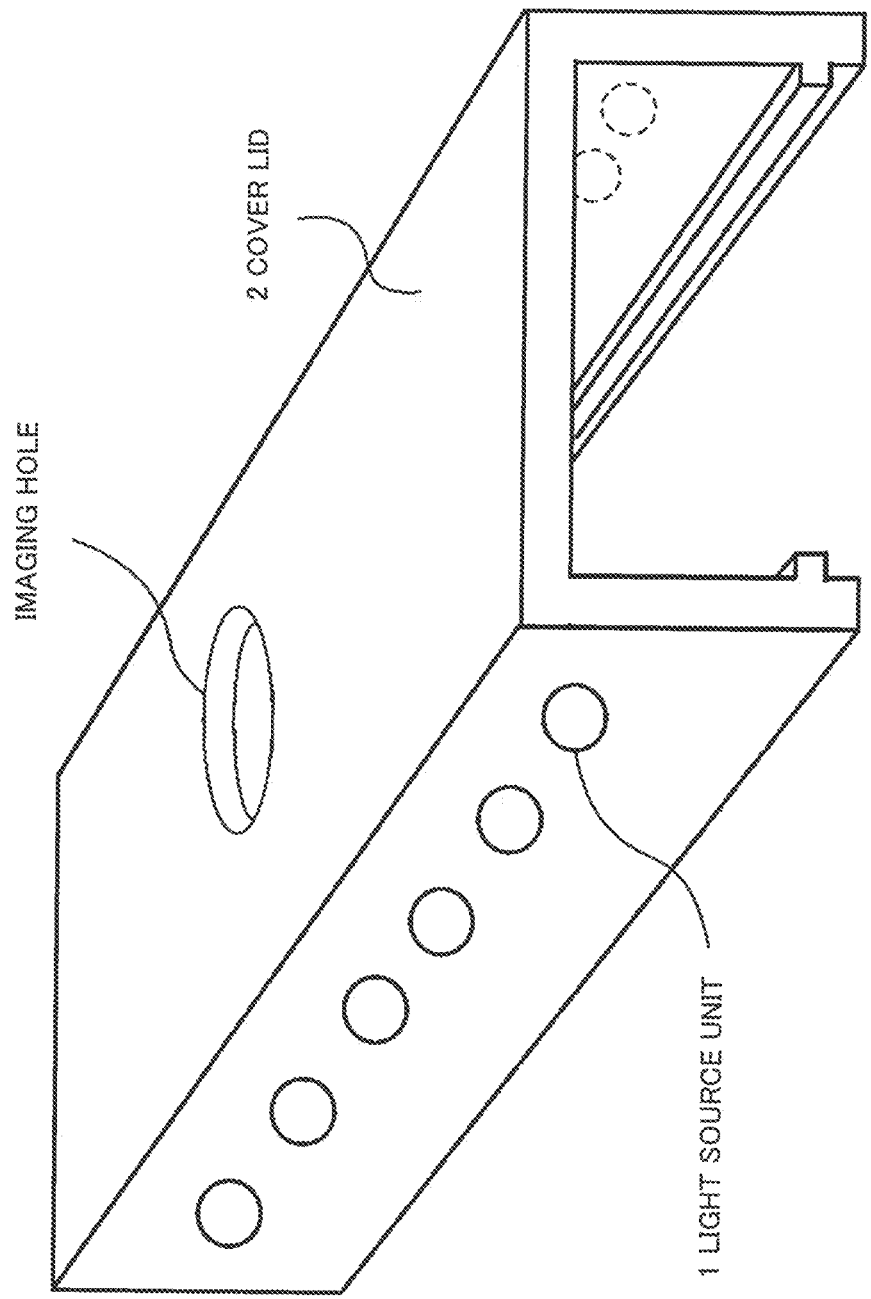
FIG. 4 is a diagram showing a configuration of an imaging aid according to a first exemplary embodiment of the present invention.

FIG. 4 shows a configuration of an imaging aid 10 according to the first exemplary embodiment of the present invention.

The imaging aid 10 according to the first exemplary embodiment includes the light source unit 1 and the cover lid 2 described above. The imaging aid 10 is formed to fit to the pearskin surface side of the object which is an imaging target, and to cover the pearskin surface. The inner surface of the upper portion of the cover lid 2, i.e., a part of the surface opposing the pearskin surface when fit to the object to be imaged is a black surface.

Figure 5:
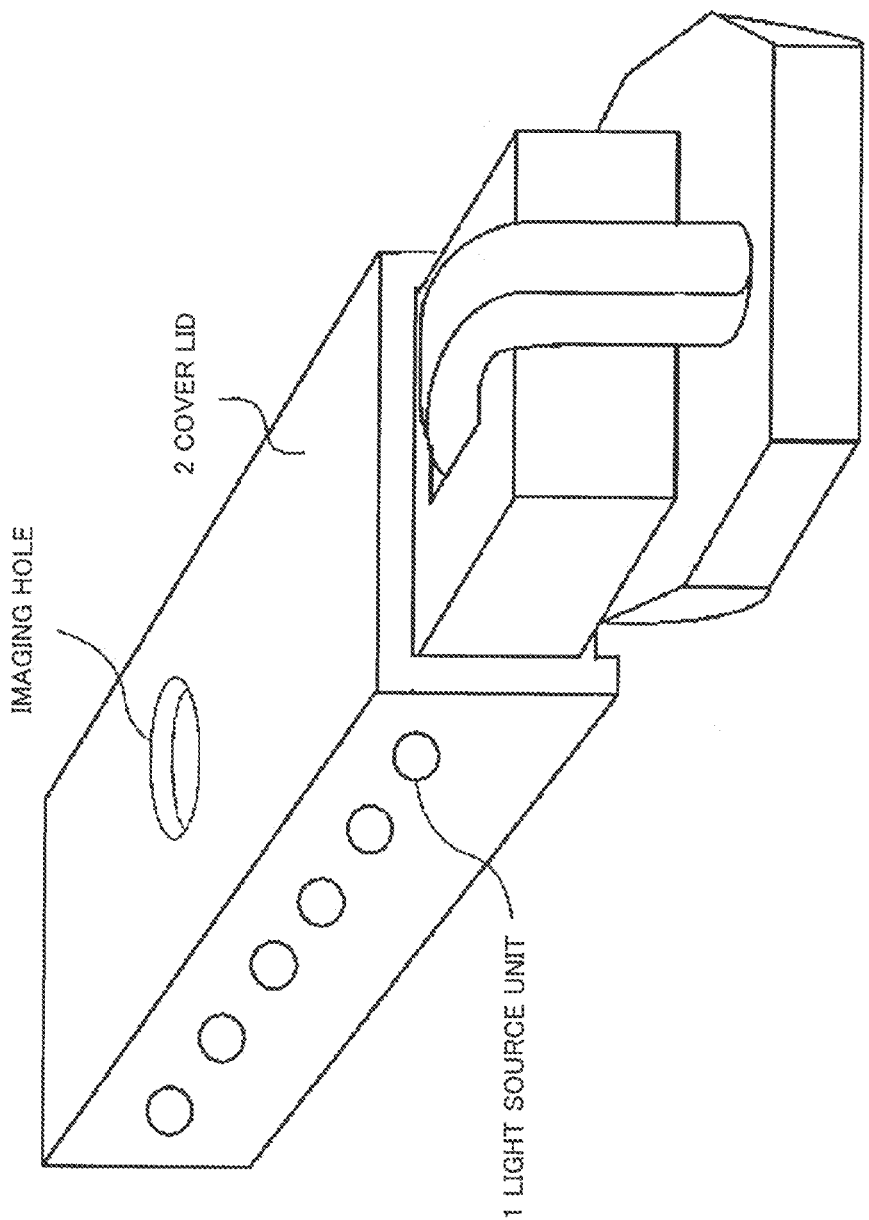
FIG. 5 is a diagram exemplifying a state in which an object is fit to the imaging aid according to the first exemplary embodiment.

By causing the object to fit the cover lid 2 of the imaging aid 10, the position and posture of the object is fixed. The object includes such parts as a fastening part, a slide fastener, a bolt, a nut, an emblem, or the like. FIG. 5 shows an example showing a state in which the object is fit to the imaging aid 10. In this example, the object is a slide fastener. In the state in which the object is fit in the imaging aid 10 in this way, a camera mounted in the imaging hole of the cover lid 2 is used to image the pearskin surface of the object. Since the black surface region inside the cover lid 2 does not reflect the illumination light from the light source unit 1, the top portion of the convex portion of the pearskin surface directly opposing the camera mounted to the imaging hole on the upper surface will be imaged to be black. Moreover, the concave portion of the pearskin surface not directly opposing the camera will reflect light from various directions and be imaged to be white. Consequently, the obtained image will have emphasized contrast between dark and light in the concave and convex portions.

The verification region of the pearskin surface is not particularly limited as long as it is a region having a pearskin pattern. However, desirably, the verification region is predetermined so that the verification becomes easy. In an example, the verification region may be determined to be a region at a position determined with reference to a reference portion of an article in common. For example, the reference portion of an article may be a trademark, a logo, a manufacturer's name, a manufacturing company, a brand name, a product name, a product number, or the like, of the product, which is attached, printed, impressed, marked with a hot iron on the article. These reference portions have the same pattern throughout items of the same article or product, and have a characteristic appearance. By determining the position and posture of these reference portions as a reference, and memorizing the characteristics thereof, the verification region of an article can be automatically detected.

The pearskin pattern is not limited to those in which the pearskin pattern is formed as a design, but also includes those in which the pearskin pattern is intentionally formed in the verification region for identification and verification of an article. Still further, the pearskin pattern is not limited to those provided by processing the metal or synthetic resin (e.g., plastic), but also includes a wrinkle pattern (e.g., grain) or the like obtained by surface processing (e.g., grain processing) leather products. In an example of a grain processed leather bag, the surface of the skin of the bag is provided with minute concave and convex portions in a random manner, and these minute concave and convex portions can be considered to be the pearskin pattern.

Figure 6:
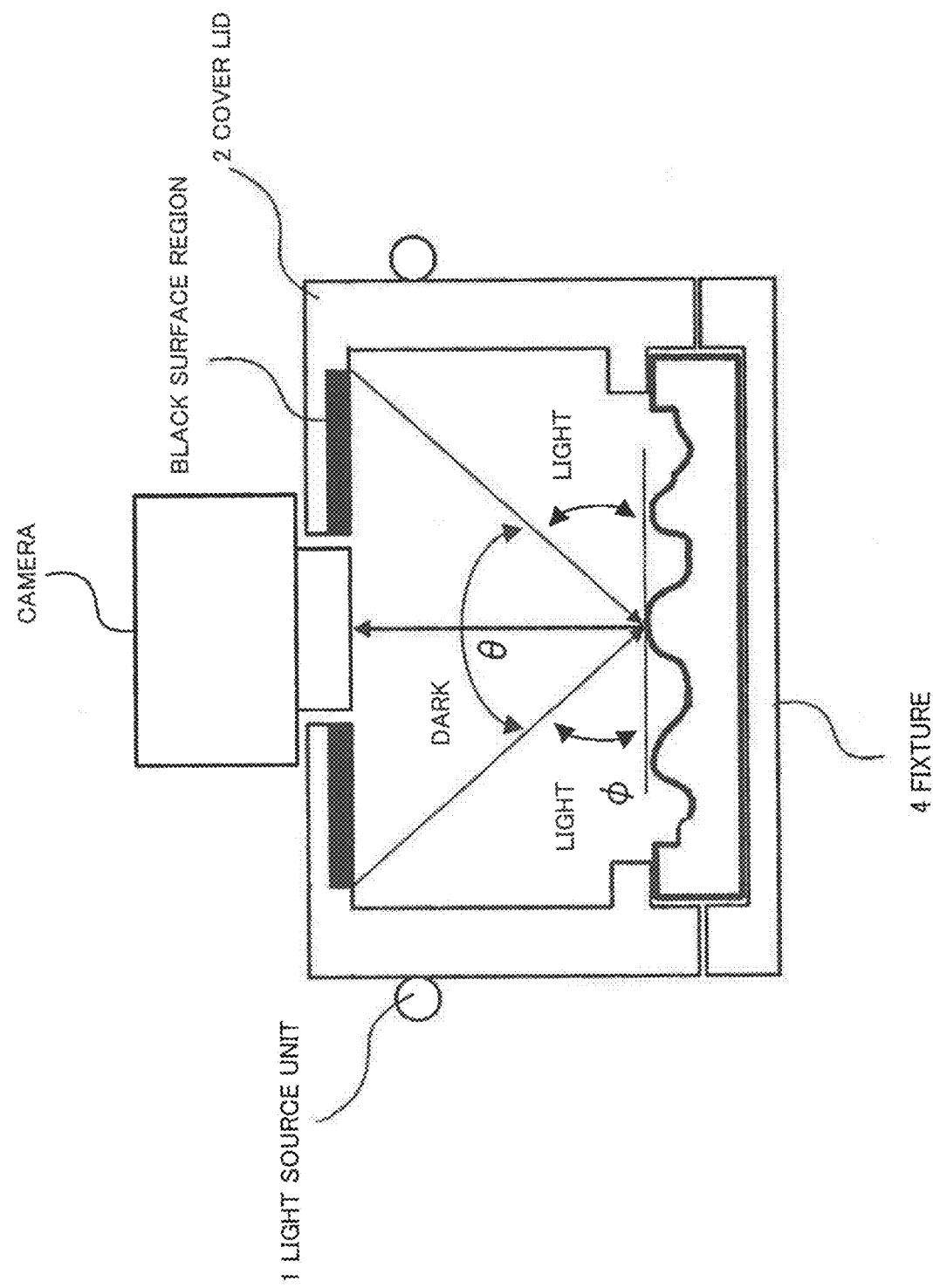
FIG. 6 is a diagram showing a modification example of the imaging aid according to the first exemplary embodiment.

Note that the imaging aid device 10 may further include a fixture 4 fixing the object fit to the cover lid 2 by sandwiching it from below as shown in FIG. 6.

Figure 7:
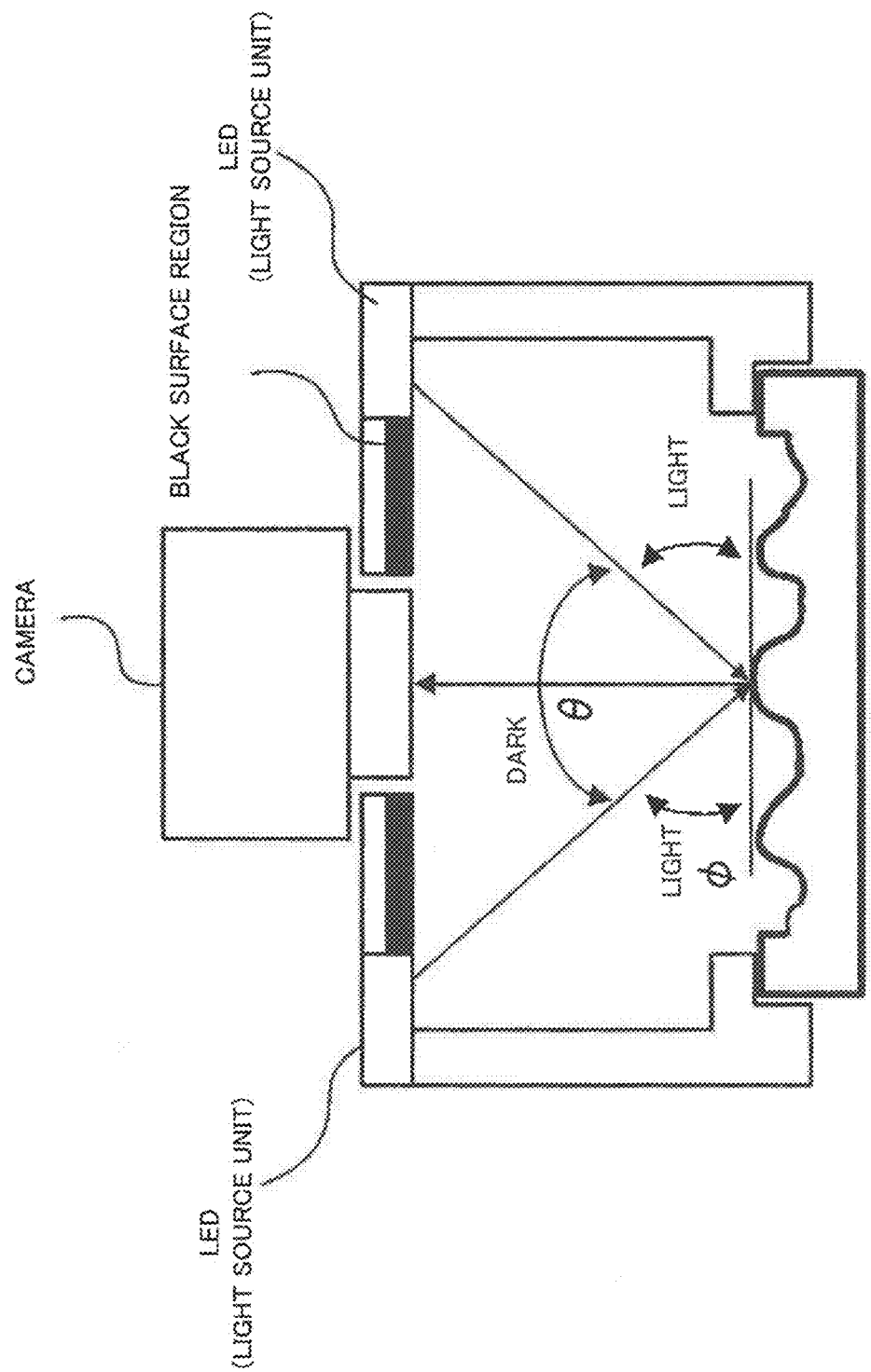
FIG. 7 is a diagram showing a modification example of the imaging aid according to the first exemplary embodiment.

Also as shown in FIG. 7, a light source unit 1 may be provided on the upper portion of the cover lid 2. In this case, the side portion may be formed by a material reflecting irradiated light (e.g., the inner side may be white).

Figure 8:
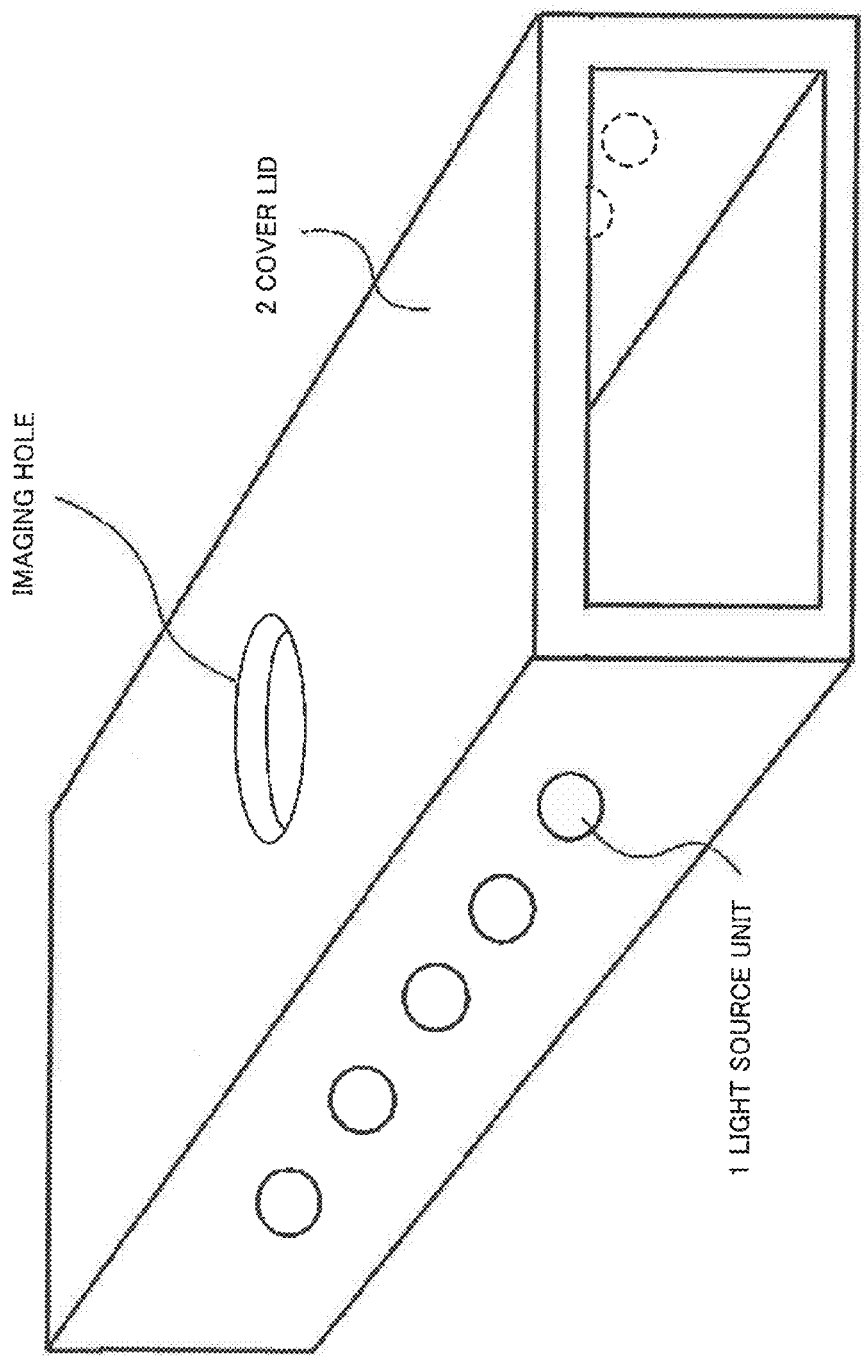
FIG. 8 is a diagram showing a modification example of the imaging aid according to the first exemplary embodiment.

Although an object is fit in the first exemplary embodiment described above, the present invention is not limited to this. It is possible to configure so that an object be inserted deep in the inner wall of the imaging aid as shown in FIG. 8.

Such configurations as exemplified by these modification examples can also achieve effects similar to those of the above-described first exemplary embodiment.

The black surface region of the cover lid 2 may be configured to be replaceable. It is possible to configure so that the size (angular ranges of dark region θ and light region ϕ) of the black surface region for each type of object is memorized in the memory device in advance, and switch the size of the black surface region by replacing the imaging aid or the like for each type of object to be imaged. Accordingly, various types of articles can be authenticated with the highest quality.

Regarding the setting of size of the black surface region (setting of angular ranges of dark region θ and light region ϕ), the number of black pixels in the verification region of the captured image of the pearskin surface was explained to be 25% of the entirety for example. However, this numerical value is an example, and it is possible to use an optimal value that can achieve the highest authentication quality, which has been obtained through experiments in advance.

In addition, the predetermined optimal value may be defined for each type of article to be verified, respectively. So as to switch the predetermined value, the article can be identified by the shape and design of the reference portion of the article, and the size of the black surface region can be adjusted so as to yield the value determined for the article.

Second Exemplary Embodiment

Figure 9:
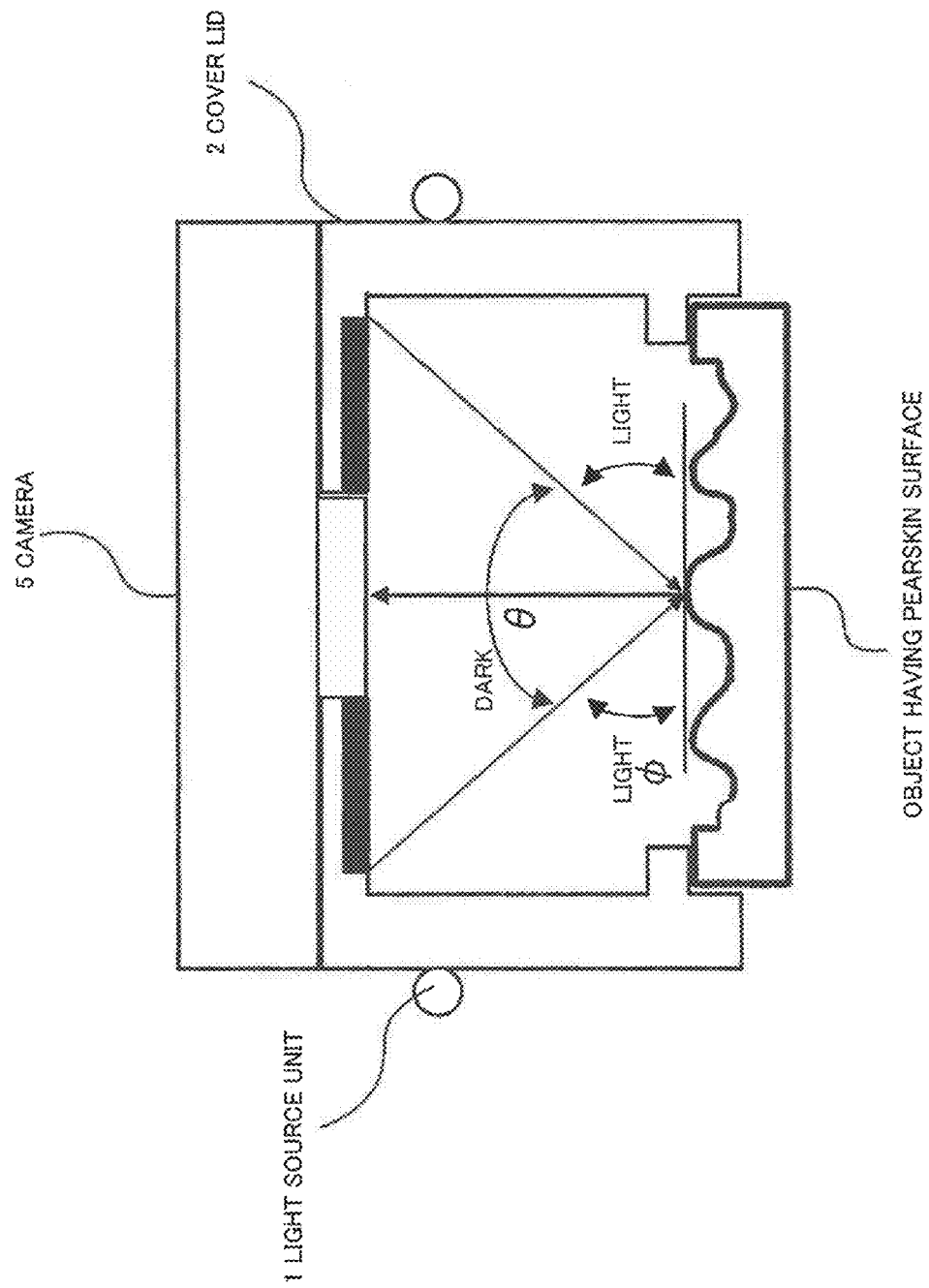
FIG. 9 is a diagram showing a configuration of an imaging device according to a second exemplary embodiment of the present invention.

FIG. 9 shows a configuration of the imaging device 20 according to the second exemplary embodiment of the present invention. The imaging device 20 according to the second exemplary embodiment is configured by the imaging aid 10 of the first exemplary embodiment and a camera 5 that are integrally formed, and the camera 5 is fixed to the imaging hole provided for the cover lid 2 of the imaging aid 10. This camera 5 images the pearskin surface of an object. The camera 5 may include a microlens.

According to the described configuration, the second exemplary embodiment can achieve a similar effect to that of the first exemplary embodiment.

Note that the mechanism for capturing an image of a pearskin surface from the normal line direction is not limited to providing the cover lid with an imaging hole to mount the camera. For example, it may be provided a half mirror and configured to capture an image of a pearskin surface through this half mirror.

Third Exemplary Embodiment

In the imaging aid 10 of the first exemplary embodiment, if the degree of adhesion of the object and the cover lid in fitting portions is low, the image may be changed due to defocusing or angular change in illumination, thereby degrading the recognizing performance. The third exemplary embodiment of the present invention that can tackle with such a problem is explained below.

Figure 10:
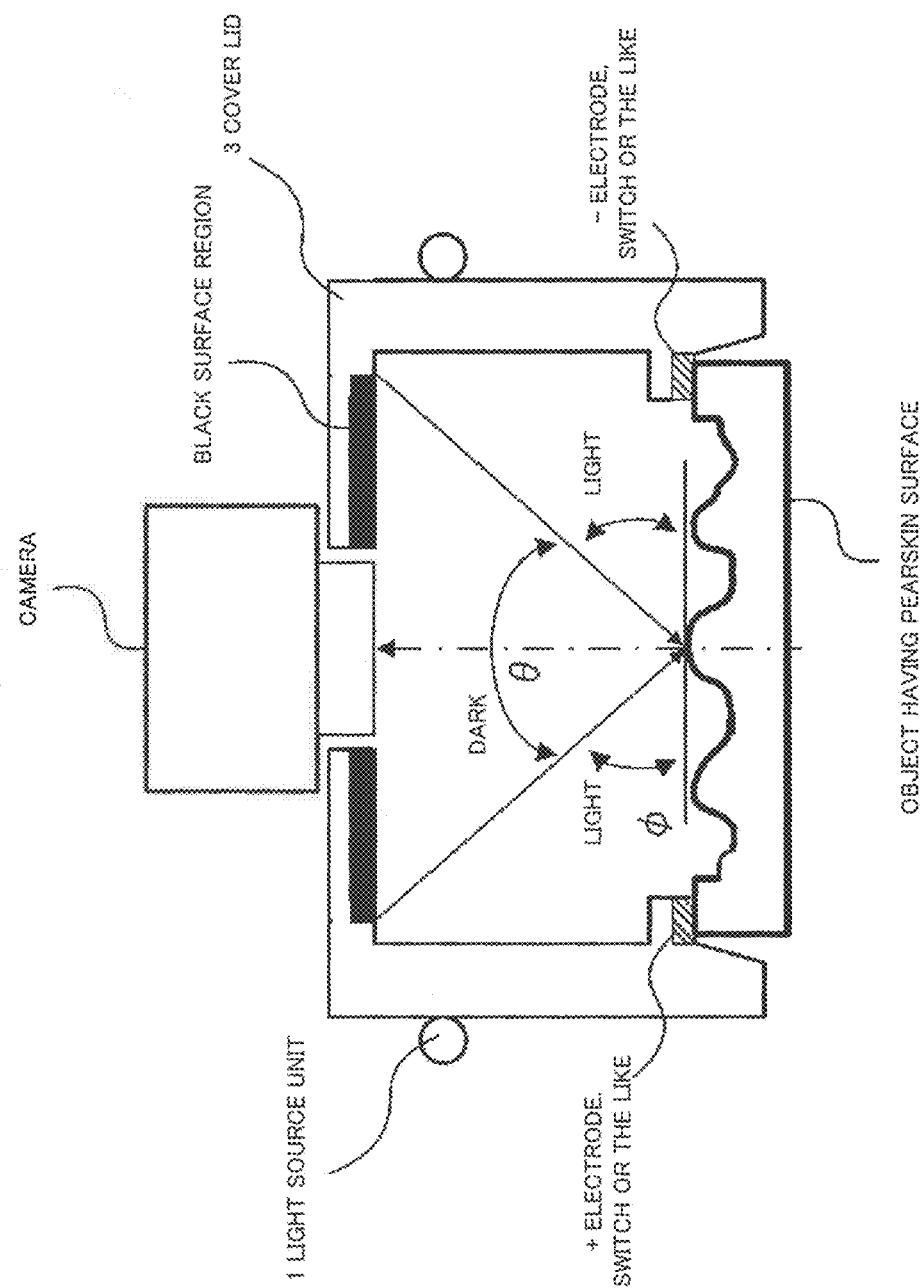
FIG. 10 is a diagram showing an imaging aid according to a third exemplary embodiment.

FIG. 10 shows a configuration of an imaging aid 30 according to the third exemplary embodiment. The cover lid 3 of the imaging aid 30 includes a mechanism for detecting that the object fit to the cover lid 3 is appropriately adhered, in addition to the configuration of the first exemplary embodiment.

Specifically, in the cover lid 3, + electrode and − electrode, or a switch, sensor or the like reacting the pressure are provided in the portion to be in contact with the fitted object (fitting portion), thereby turning ON (illumination) the light source unit 1 when the object is appropriately adhered, and turning OFF (non-illumination) the light source unit 1 when the object is not appropriately adhered. For example when the object is a metal part, + electrode may be provided in one side of the fitting portion, and − electrode in the other side of it, to obtain a configuration so that a current is supplied to the light source unit 1 to turn it ON when there is short between these + and − electrodes. When the object is not metal, one or both sides of the fitting portion may be provided with a switch or a sensor reacting to the pressure, to obtain a configuration so that a current is supplied to the light source unit 1 to turn it ON when the switch or the like has detected a certain pressure.

Accordingly, the camera can detect the lightness when the light source unit 1 is turned ON (illumination) and perform imaging, which enables the camera to refrain from imaging when there is failure in adhesion, and to perform imaging at an adequate timing (at the time of favorable adhesion).

In addition, the present embodiment can enable usage as an independent part even without interconnect or connection with a camera or an imaging device, which helps manufacturing at reduced cost.

Fourth Exemplary Embodiment

The following explains the fourth exemplary embodiment of the present invention.

Figure 11:
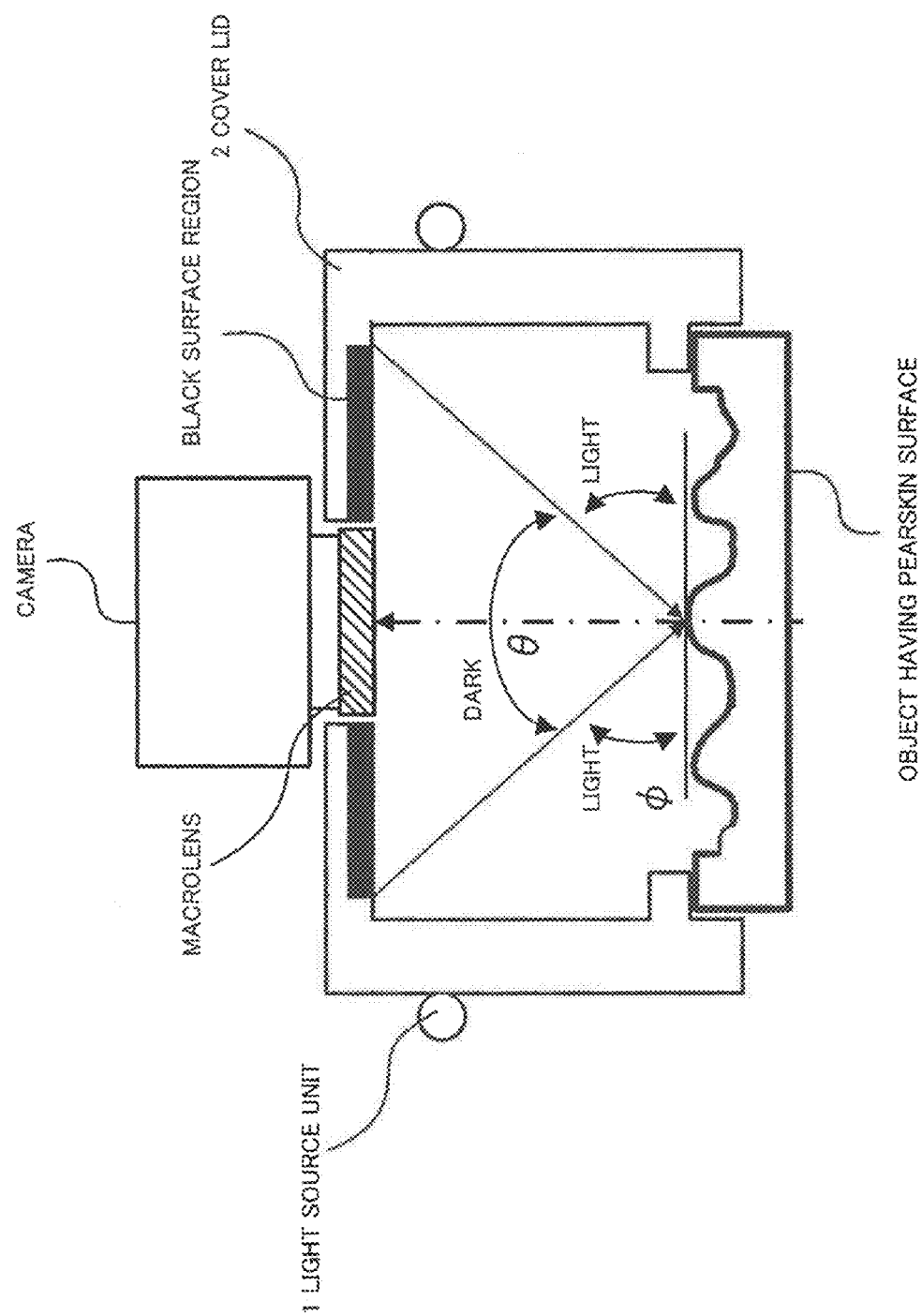
FIG. 11 is a diagram showing an imaging aid according to a fourth exemplary embodiment.

FIG. 11 shows a configuration of an imaging aid 40 according to the fourth exemplary embodiment. The imaging aid 40 is provided with a microlens in a portion to which a camera is mounted. Accordingly, any smartphone, camera-equipped portable telephone, or the like that are commercially available can be used, instead of dedicated cameras for recognition, which helps reduce the cost.

It should be noted that above-described first to fourth embodiments may be combined.

Part or all of the above-described exemplary embodiments can also be described as follows, however should not be limited to as below.

(Supplementary Note 1) An imaging aid aiding imaging of a predetermined region of a surface of an object having minute concave and convex portions and being subject to intense specular reflection, including:

a light source unit that irradiates light; and a cover lid that has a shape to cover a predetermined region of a surface of the object, where a part of a surface of the cover lid corresponding to a predetermined angular range from a normal line direction directly opposing the predetermined region is a black surface, and another surface of the cover lid corresponding to another angular range is made of a light-source surface diffusing and emitting light irradiated from the light source unit.

(Supplementary Note 2) The imaging aid according to Supplementary Note 1, where the cover lid is provided with a mechanism for imaging the predetermined region from the normal line direction, in the black surface region.

(Supplementary Note 3) The imaging aid according to Supplementary Note 1 or 2, where a region to be the black surface is determined based on a predetermined angular range that is determined with respect to a normal line in a predetermined region of a pearskin surface of the object.

(Supplementary Note 4) The imaging aid according to any one of Supplementary Notes 1-3, where the angular range of the black surface region of the cover lid is determined so that a degree of separation of a brightness value of pixels in the predetermined region in an image obtained by imaging the pearskin surface of the object or a number of pixels having brightness equal to or below a predetermined threshold value becomes a predetermined value.

(Supplementary Note 5) The imaging aid according to any one of Supplementary Notes 1-4, where the angular range of the black surface region is determined for each article to be imaged, the type of the article to be imaged is identified, without depending on individual items, by characteristic appearance of the article to be imaged, the appearance having a same pattern throughout Supplementary Notes of the same article, and the imaging aid includes a mechanism to adjust the angular range of the black surface region, to a predetermined value determined to the type of the article.

(Supplementary Note 6) The imaging aid according to any one of Supplementary Notes 1-5, having a shape to fit to and fix a part including at least one of a fastening part, a slide fastener, a bolt, a nut, and an emblem.

(Supplementary Note 7) The imaging aid according to any one of Supplementary Notes 1-6, where the cover lid has a shape to fit to and fix an object, and the imaging aid further includes a mechanism to turning ON the light source unit if the fitted object is in close contact with a fitting portion of the cover lid.

(Supplementary Note 8) The imaging aid according to any one of Supplementary Notes 1-7, where the imaging aid has a shape to appropriately fit to the article for each type of object to be imaged, a range of a predetermined black surface region is set for each article, and the imaging aid is replaceable with respect to a camera.

(Supplementary Note 9) The imaging aid according to any one of Supplementary Notes 1-8, where a microlens is provided at a portion of the cover lid to mount thereon a camera.

(Supplementary Note 10) An imaging device being a camera mounting thereon the imaging aid according to any one of Supplementary Notes 1-9.

(Supplementary Note 11) An imaging device imaging a pearskin surface having a pearskin pattern provided on an object, including:

a light source unit that irradiates light;

a camera; and a cover lid that has a shape to cover a predetermined region of the pearskin surface, where a part of the pearskin surface corresponding to a predetermined angular range from a normal line direction of the predetermined region of the pearskin surface is a black surface, another surface corresponding to another angular range is made of a surface diffusing light irradiated from the light source unit, and an imaging hole to mount the camera is provided on a center of the black surface.

(Supplementary Note 12) An imaging method for aiding imaging of a predetermined region of a surface of an object having minute concave and convex portions and being subject to intense specular reflection, where a cover lid has a shape to cover a predetermined region of a surface of the object, a part of a surface of the cover lid corresponding to a predetermined angular range from a normal line direction directly opposing the predetermined region is a black surface, and another surface of the cover lid corresponding to another angular range is made of a light-source surface diffusing and emitting light irradiated from a light source unit.

(Supplementary Note 13) The imaging method according to Supplementary Note 12, where in the black surface region of the cover lid, a mechanism for imaging the predetermined region from the normal line direction is provided.

(Supplementary Note 14) The imaging method according to Supplementary Note 12 or 13, a region to be the black surface is determined based on a predetermined angular range that is determined with respect to a normal line in a predetermined region of a pearskin surface of the object.

(Supplementary Note 15) The imaging method according to any one of Supplementary Notes 12 to 14, where the angular range of the black surface region is determined so that a degree of separation of a brightness value of pixels in the predetermined region in an image obtained by imaging a pearskin surface of the object or a number of pixels having brightness equal to or below a predetermined threshold value becomes a predetermined value.

(Supplementary Note 16) The imaging method according to any one of Supplementary Notes 12 to 15, where the angular range of the black surface region is determined for each article to be imaged, the type of the article to be imaged is identified, without depending on individual items, by characteristic appearance of the article to be imaged, the appearance having a same pattern throughout Supplementary Notes of the same article, and the imaging method adjusting the angular range of the black surface region, to a predetermined value determined to the type of the article.

(Supplementary Note 17) The imaging method according to any one of Supplementary Notes 12 to 16, causing to fit to and fixed to the cover lid, a part including at least one of a fastening part, a slide fastener, a bolt, a nut, and an emblem.

(Supplementary Note 18) The imaging method according to any one of Supplementary Notes 12 to 17, causing a part to fit to and fixed to the cover lid, and turning ON the light source unit if the fitted object is in close contact with a fitting portion of the cover lid.

(Supplementary Note 19) The imaging method according to any one of Supplementary Notes 12 to 18, where a range of a predetermined black surface region to appropriately fit to the article for each type of object to be imaged is set for each article, and the range of the black surface is replaceable with respect to a camera.

(Supplementary Note 20) The imaging method according to any one of Supplementary Notes 12 to 19, where a microlens is provided at a portion of the cover lid to mount thereon a camera.

(Supplementary Note 21) The imaging method according to any one of Supplementary Notes 12 to 20, where the cover lid is mounted to a camera.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The present application claims the priority of Japanese Patent Application No. 2012-172701 filed on Aug. 3, 2012, the disclosure of which is incorporated herein in its entirety.

REFERENCE SIGNS LIST 1 light source unit
2 cover lid
5 camera
10 imaging aid
20 imaging device

What is claimed is:

1. An imaging aid aiding imaging of a predetermined region of a surface of an object having minute concave and convex portions and being subject to intense specular reflection, comprising:
    a light source unit that irradiates light; and
    a cover lid that has a shape to cover a predetermined region of a surface of the object, wherein
    a part of a surface of the cover lid corresponding to a predetermined angular range from a normal line direction directly opposing the predetermined region is a black surface, and another surface of the cover lid corresponding to another angular range is made of a light-source surface diffusing and emitting light irradiated from the light source unit, and
    the cover lid comprises
    a upper portion facing the surface of object; and
    a side portion provided between the surface of object and the upper portion and connecting the upper portion; wherein
    the light source unit is provided near(on) the side of the upper portion of the side portion of the cover lid, and
    a region to be the black surface is provided on the inner surface of upper portion according to a predetermined angular range centered on a normal line of the surface of the object,
    the angular range of the black surface region of the cover lid is determined so that a degree of separation of a brightness value of pixels in the predetermined region in an image obtained by imaging the surface of the object equal to or below a predetermined threshold value becomes a predetermined value.

2. The imaging aid according to claim 1, wherein
    the cover lid is provided with a mechanism for imaging the predetermined region from the normal line direction, in the black surface region.

3. The imaging aid according to any one of claim 1, wherein
    the cover lid has a shape to fit to and fix an object, and
    the imaging aid further comprises a mechanism to turning ON the light source unit if the fitted object is in close contact with a fitting portion of the cover lid.

4. The imaging aid according to any one of claim 1, wherein
the imaging aid has a shape to appropriately fit to the article for each type of object to be imaged,
a range of a predetermined black surface region is set for each article, and
the imaging aid is replaceable with respect to a camera.

5. The imaging aid according to any one of claim 1, wherein
a microlens is provided at a portion of the cover lid to mount thereon a camera.

6. An imaging device being a camera mounting thereon the imaging aid according to claim 1.

7. The imaging aid according to claim 1, wherein
the imaging aid is configured so that a camera, imaging the pearskin surface having the pearskin pattern provided on the object, can be mounted,
the cover lid has a shape to cover a predetermined region of the pearskin surface, wherein
a part of the pearskin surface corresponding to a predetermined angular range from a normal line direction of the predetermined region of the pearskin surface is a black surface, another surface corresponding to another angular range is made of a surface diffusing light irradiated from the light source unit, and an imaging hole to mount the camera is provided on a center of the black surface.

* * * * *